(12) United States Patent
Lu et al.

(10) Patent No.: US 8,513,159 B2
(45) Date of Patent: Aug. 20, 2013

(54) PROCESS OF MANUFACTURING POWDERED COFFEE CARBONS FROM SPENT COFFEE GROUNDS

(76) Inventors: Jen-Huan Lu, Xinzhuang (TW); Wang-Hsing Lee, Taoyuan (TW)

( * ) Notice: Subject to any disclaimer, the term of this patent is extended or adjusted under 35 U.S.C. 154(b) by 774 days.

(21) Appl. No.: 12/727,413

(22) Filed: Mar. 19, 2010

(65) Prior Publication Data

US 2011/0226602 A1   Sep. 22, 2011

(51) Int. Cl.
*C01B 31/12* (2006.01)
(52) U.S. Cl.
USPC .......................................... 502/427; 502/437
(58) Field of Classification Search
USPC .................................. 502/427, 437
See application file for complete search history.

(56) References Cited

U.S. PATENT DOCUMENTS 5,726,118 A * 3/1998 Ivey et al. ..................... 502/417

* cited by examiner

*Primary Examiner* — Stuart Hendrickson (57) ABSTRACT

A process of manufacturing powdered coffee carbons from spent coffee grounds includes: washing spent coffee grounds, dehydrating same, and conveying same to a pre-carbonation oven for drying and pre-carbonization; removing the pre-carbonized spent coffee grounds, soaking same in a solution mixed with a predetermined quantity of sodium carbonate for a predetermined period of time for grease removal, and washing the grease free spent coffee grounds; pouring the pre-carbonized spent coffee grounds into a post-carbonization oven and heating same to the range of 600 to 650° C. to carbonize the pre-carbonized spent coffee grounds so that the carbonized spent coffee grounds have a porous structure; supplying saturated steam between 850 and 950° C. to the carbonized spent coffee carbons for activation; and operating a wet grinder to grind the activated spent coffee carbons until powdered coffee carbons having a size between 0.1 and 20 μm are obtained.

5 Claims, 8 Drawing Sheets

| Test Organisms | Staphylococcus aureus and Klebsiella pneumoniae |
|---|---|
| Incubation Temperature | 37±2°C |
| Incubation Period | 18-24 hours |
| Agar Medium | Nutrient Agar |
| Tested Specimen | Fibrous textile material with powdered coffee carbons |

FIG. 5A

| Test Organisms | Results |
|---|---|
| Staphylococcus aureus | No growth of Staphylococcus aureus was observed directly underneath the tested specimen |
| Klebsiella pneumoniae | No growth of Klebsiella pneumoniae was observed directly underneath the tested specimen |

FIG. 5B

| | |
|---|---|
| Test Organisms | Staphylococcus aureus and Klebsiella pneumoniae |
| Incubation Temperature | 37±2°C |
| Incubation Period | 18-24 hours |
| Agar Medium | Nutrient Agar |
| Tested Specimen | yarns coated with powdered coffee carbons and dyed |

FIG. 5C

| Test Organisms | Results |
|---|---|
| Staphylococcus aureus | No growth of Staphylococcus aureus was observed directly underneath the tested specimen |
| Klebsiella pneumoniae | No growth of Klebsiella pneumoniae was observed directly underneath the tested specimen |

FIG. 5D

| Sample | PU film having powdered coffee carbons with the size of 10cm x 10cm |
|---|---|
| Gasbag Size | 5L |
| Gas used | Ammonia |
| Amount of Gas Packed | 3L |
| Elapsed Time | After 2 hours |
| Efficiency of Deodorization(%) | ((CB-CS)/CB)X100<br>CB : Blank, concentration of the test gas remained in the gasbag after 2 hours<br>CS : Sample, concentration of the test gas remained in the gasbag after 2 hours |

FIG. 5E

| Efficiency of Deodorization(%) | 46.6 |
|---|---|
| CB (ppm) | 58 |
| CS (ppm) | 31 |

FIG. 5F

| | |
|---|---|
| Sample | Fabric having powdered coffee carbons with the size of 10cm x 10cm (manufactured by applying adhesive) |
| Gasbag Size | 5L |
| Gas used | Ammonia |
| Amount of Gas Packed | 3L |
| Elapsed Time | After 2 hours |
| Efficiency of Deodorization(%) | ((CB-CS)/CB)X100 |

FIG.5G

| | |
|---|---|
| Efficiency of Deodorization(%) | 50.0 |
| CB (ppm) | 60.0 |
| CS (ppm) | 30.0 |

FIG. 5H

PROCESS OF MANUFACTURING POWDERED COFFEE CARBONS FROM SPENT COFFEE GROUNDS

BACKGROUND OF THE INVENTION

1. Field of Invention

The invention relates to processes of manufacturing powdered coffee carbons and more particularly, to such a process of manufacturing powdered coffee carbons from spent coffee grounds.

2. Description of Related Art

Global warming is a critical issue to be addressed, since it may cause abnormal weather such as flooding, drought, etc. Various recycling techniques have been developed and are daily employed in order to mitigate global warming, reduce garbage, and increase reuse and recycling.

The consumption of activated carbons is increased gradually, which contributes greatly to the environmental disasters. To solve the problem, an environmental friendly activated carbons source (i.e., waste recycle) is critical. Further, it can save energy.

Conventional sources of activated carbons are wood, coconut shells, by-products of fuel instillation, etc. However, they are disadvantageous. For example, tree cutting is a labor-intensive job and can consume green energy. Extracting activated carbons from coconut shells is also a labor-intensive job.

Therefore, the need for improvements exists.

SUMMARY OF THE INVENTION

It is therefore one object of the invention to provide a process of manufacturing powdered coffee carbons from spent coffee grounds comprising (A) washing spent coffee grounds with fresh water, dehydrating same, and conveying same to a pre-carbonation oven for drying and pre-carbonization; (B) removing the pre-carbonized spent coffee grounds from the pre-carbonization oven, soaking same in a solution mixed with a predetermined quantity of sodium carbonate ($Na_2Co_3$) for a predetermined period of time for grease removal, and washing the grease free spent coffee grounds with fresh water; (C) pouring the pre-carbonized spent coffee grounds into a post-carbonization oven and heating the pre-carbonized spent coffee grounds to the range of 600 to 650° C. to carbonize the pre-carbonized spent coffee grounds wherein so that the carbonized spent coffee grounds have a porous structure; (D) supplying saturated steam of 850 to 950° C. to the carbonized spent coffee carbons for activation; and (E) operating a wet global grinder to grind the activated spent coffee carbons until powdered coffee carbons having a size between 0.1 and 20 μm are obtained.

The above and other objects, features and advantages of the invention will become apparent from the following detailed description taken with the accompanying drawings.

DETAILED DESCRIPTION OF THE INVENTION

Figure 1:
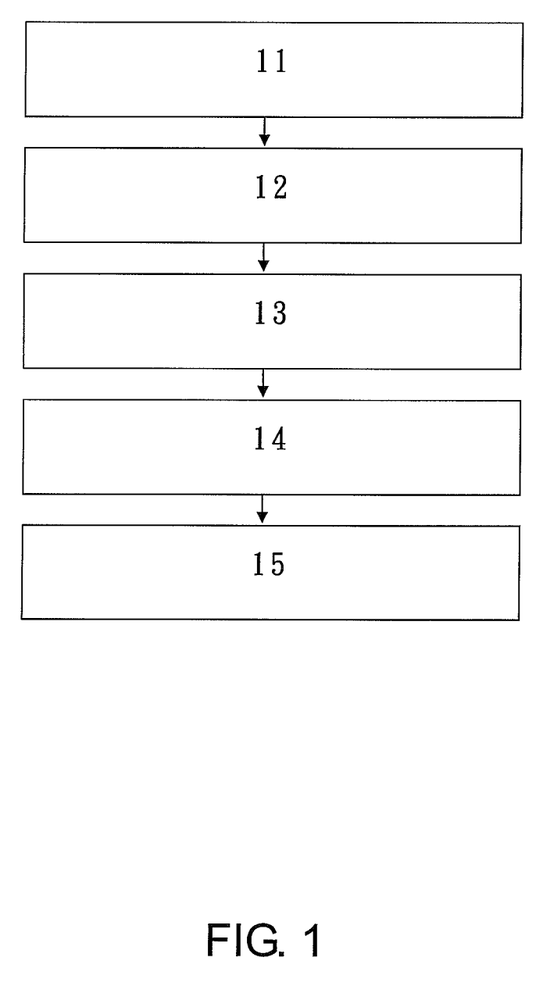
FIG. 1 is a flow chart illustrating a process of manufacturing powdered coffee carbons from spent coffee grounds according to the invention.

Referring to FIG. 1, a flow chart illustrating a process of manufacturing powdered coffee carbons from spent coffee grounds of the invention comprises the following steps in order as discussed in detail below.

In step 11, a pre-carbonization step is involved. In detail, spent coffee grounds after brewing are washed with fresh water. Next, it is dehydrated. Next, it is conveyed to a pre-carbonation oven for drying and pre-carbonization. The pre-carbonization oven is cylindrical and formed of steel. Temperature of the pre-carbonization oven for drying is kept in the range of 170 to 185° C. for 85 to 120 minutes with a steam pressure of 3 to 6 $Kg/cm^2$. The above conditions are only experimental values and may be changed depending on the sources of spent coffee grounds. This pre-carbonization step is necessary, since grease contained in the spent coffee grounds may form tar which may obtain low quality powdered coffee carbons if the pre-carbonization step is eliminated.

In step 12, a step of removing grease from the pre-carbonized spent coffee grounds is involved. In detail, the pre-carbonized spent coffee grounds are removed from the pre-carbonization oven and soaked in a solution mixed with 0.5 g/l of sodium carbonate ($Na_2Co_3$) for about 120 minutes in order to remove grease from the spent coffee grounds. The grease-free spent coffee grounds are then washed with fresh water. As a result, the spent coffee grounds are substantially black and have a flavor of tar. The soak time can be reduced if the solution is heated to 60 to 70° C.

In step 13, a step of forming coarse coffee carbons is involved. In detail, the pre-carbonized spent coffee grounds are poured into a post-carbonization oven heated by a FIR (far infrared) heater. The pre-carbonized spent coffee grounds are heated to a temperature in a range of 600 to 650° C. for drying. After drying, the pre-carbonized spent coffee grounds are carbonized (i.e., pyrolysis) due to high heat and lack of oxygen. As a result, the coffee carbons having a porous structure are obtained. The coffee carbons are not powdered, and, thus, further processing is required.

In step 14, an activation step for the coffee carbons is involved. In detail, saturated steam having a temperature between 850 and 950° C. is supplied to the post-carbonization oven to activate the coffee carbons. As a result, activated coffee carbons having fine granules are obtained. The activated coffee carbons have an improved dirt removal performance.

Figure 3:
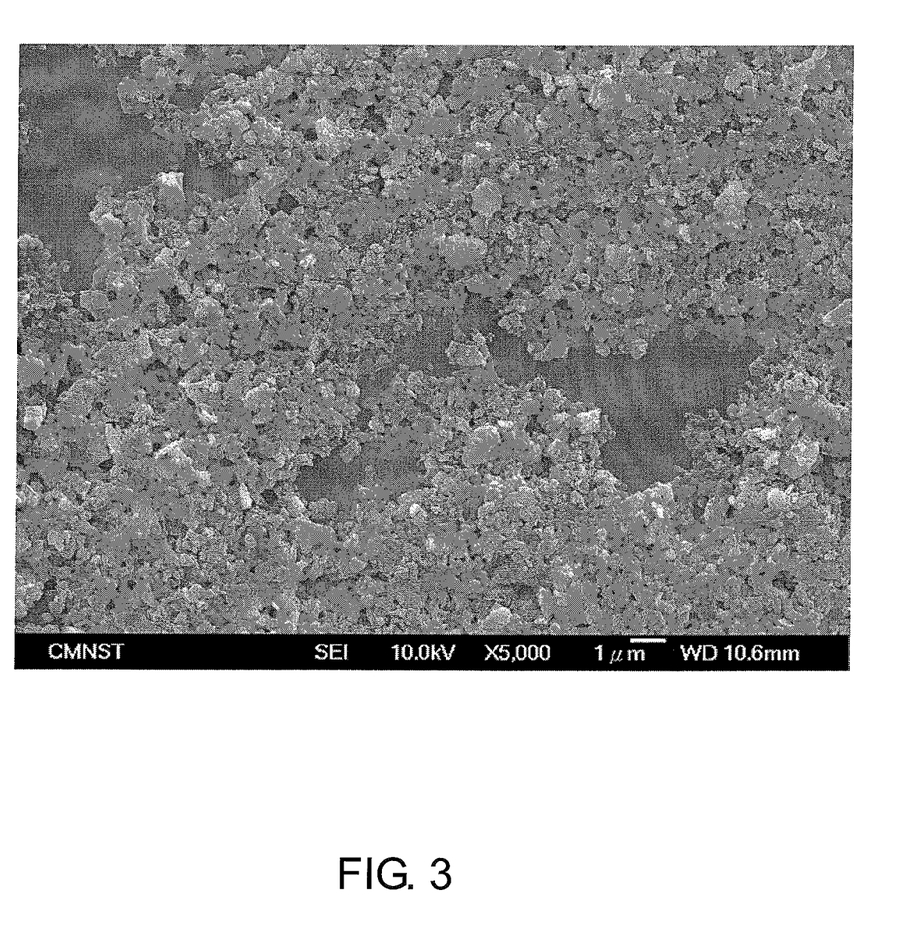
FIG. 3 is a microscopic photograph of the powdered coffee carbons.

In step 15, a grinding step of the activated coffee carbons is involved. FIG. 3 is a microscopic photograph of the powdered coffee carbons. Both powdered coffee carbons and activated carbons have excellent adhesion and thus can be employed as filters, micro-organism killing materials, etc. Note that the powdered coffee carbons may have the fine structure similar to that of nanoscale components. The grinding of the activated coffee carbons is done by a wet grinder and involves the following three stages:

Stage I is for grinding the activated coffee carbons to have structure of the size of several micrometers. In detail, the activated coffee carbons are poured into a grinder having coarse grinding balls having a diameter between 1.75 and 2.5 mm. Next, pure water or solvent (e.g., isopropyl alcohol) is employed to mix with the activated coffee carbons until the activated coffee carbons have a viscosity of about 100,000 centipoises (cps) and a solid percentage of 80 to 85 wt %. The grinder operates for a predetermined period of time. Next, a drying process is employed. As a result, powdered coffee carbons having structure of the size of about 20 μm are obtained. The micrometer sized powdered coffee carbons can be employed for the manufacturing of filters, masks for medical purposes, etc.

Stage II is for further grinding the micrometer sized powdered coffee carbons to have structure of the size of about two micrometers. In detail, the micrometer sized powdered coffee carbons are poured into another grinder having fine grinding balls with a diameter between 0.7 and 0.9 mm. Next, pure water or solvent (e.g., isopropyl alcohol) is employed to mix with the micrometer sized powdered coffee carbons until the micrometer sized powdered coffee carbons have a viscosity of less than 2,000 cps and a solid percentage of 70 to 75 wt %. The grinder operates for a predetermined period of time. Next, a drying process is employed. As a result, powdered coffee carbons having structure of the size of about 2 μm are obtained. The micrometer sized powdered coffee carbons can be employed for the manufacturing of yarns, etc.

Stage III is for still further grinding the micrometer sized powdered coffee carbons obtained from stage II to have structure of the size of about 0.1 micrometers (i.e., similar to nanoscale components). In detail, the micrometer sized powdered coffee carbons are poured into still another grinder having fine grinding balls with a diameter between 0.4 and 0.6 mm. Next, pure water or solvent (e.g., isopropyl alcohol) is employed to mix with the micrometer sized powdered coffee carbons until the micrometer sized powdered coffee carbons have a viscosity of less than 100 cps and a solid percentage of 30 to 35 wt %. The grinder operates for a predetermined period of time. Next, a drying process is employed. As a result, powdered coffee carbons having structure of the size of about 0.1 μm are obtained. The micrometer sized powdered coffee carbons (i.e., similar to nanoscale components) can be employed for the manufacturing of yarns, coating materials, etc.

Tests (I) Pathogenic Micro-organisms Reduction Test

Figure 4:
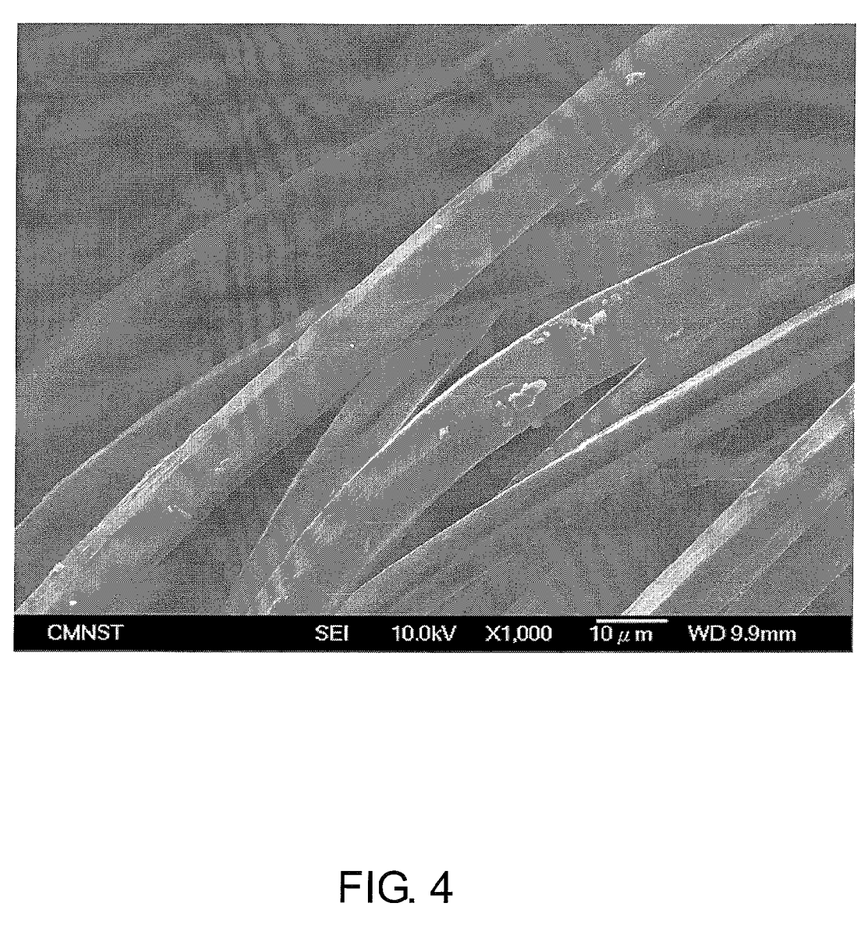
FIG. 4 is a microscopic photograph of powdered coffee carbons adhered onto yarns.
Figure 5A:
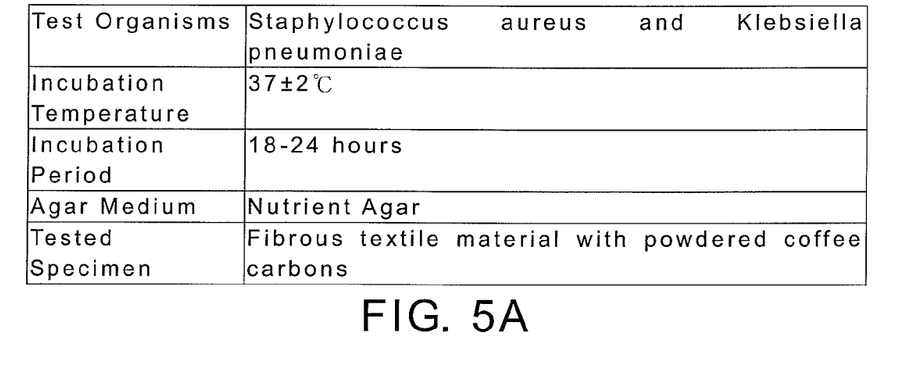
FIG. 5A tabulates test organisms and conditions regarding adding the powdered coffee carbons similar to nanoscale components of the invention polymer for forming yarns.

The powdered coffee carbons similar to nanoscale components are added to a polymer, and a threading making process is performed. FIG. 4 shows a microscopic photograph of powdered coffee carbons adhered onto yarns. The yarns are thus produced into a fibrous textile material (i.e., Polyester fibrous textile). The test organisms and test conditions regarding the above addition and thread making process are tabulated in FIG. 5A.

Figure 5B:
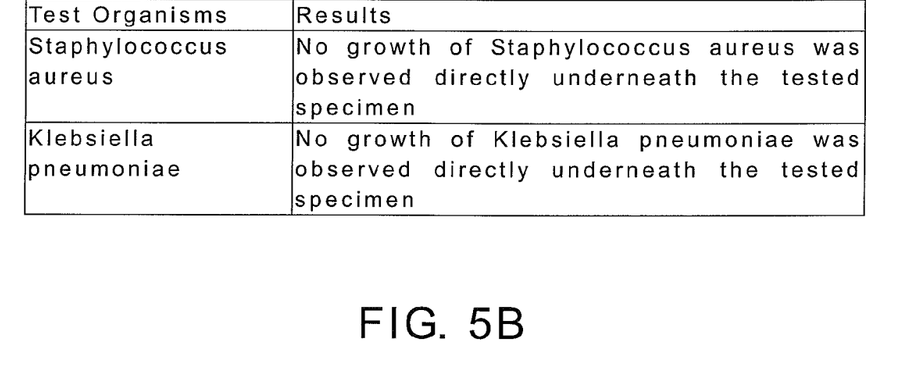
FIG. 5B tabulates test results with respect to the test organisms of FIG. 5A.

Moreover, as tabulated with respect to test organisms in FIG. 5B, the powdered coffee carbons similar to nanoscale components added to polymer with a threading making process being performed can manufacture a fibrous textile material capable of reducing the number of viable pathogenic micro-organisms.

Figure 5C:
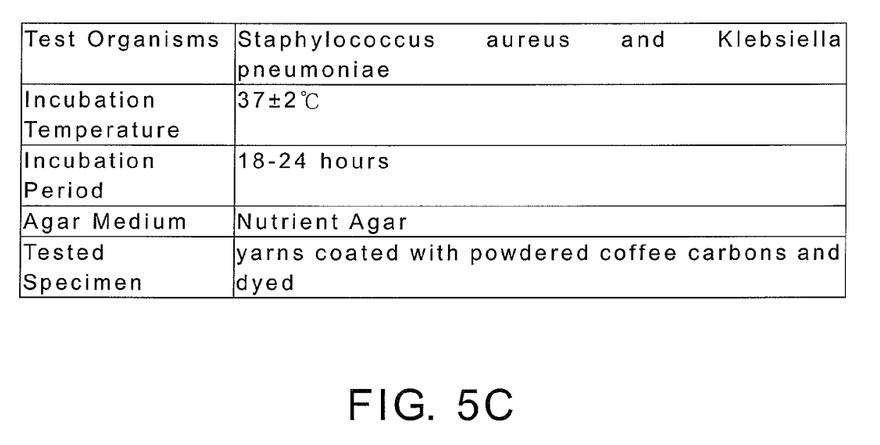
FIG. 5C tabulates test organisms and test conditions regarding dyeing yarns coated with the powdered coffee carbons similar to nanoscale components and fabric manufacturing.

Further, one piece of sample said to be 94% Nylon and 6% Spandex woven fabric is dyed with powdered coffee carbons similar to nanoscale components. The test organisms and test conditions regarding the above woven fabric dyed with powdered coffee carbons similar to nanoscale components are tabulated in FIG. 5C.

Figure 5D:
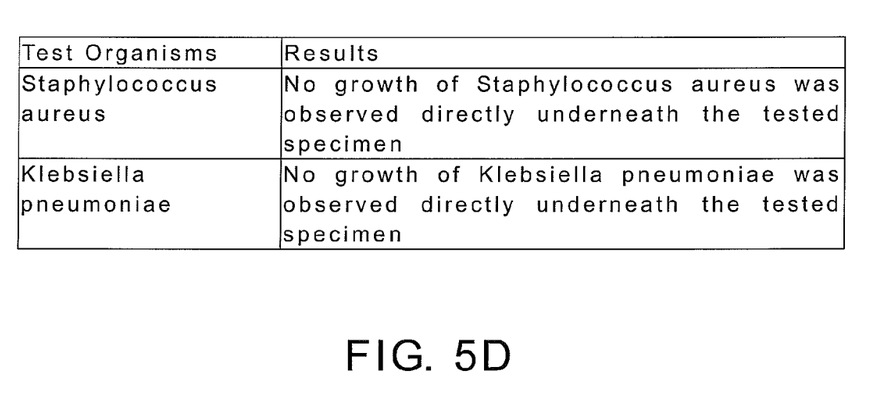
FIG. 5D tabulates test results with respect to the test organisms of FIG. 5C.

Furthermore, as tabulated with respect to test organisms in FIG. 5D, the woven fabric dyed with powdered coffee carbons similar to nanoscale components is tested. It is shown that the fabric has excellent capability of reducing the number of viable pathogenic micro-organisms.

(II) Deodorization Test

Figure 5E:
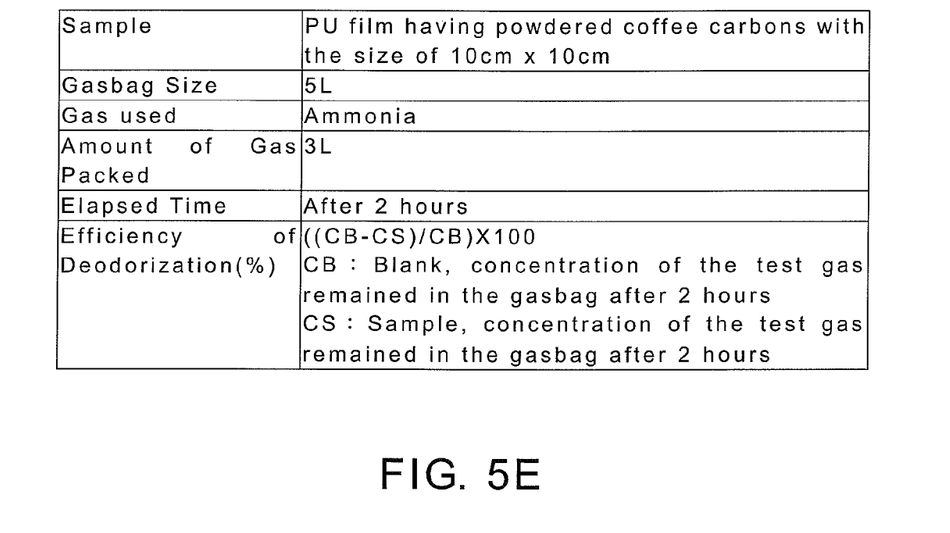
FIG. 5E tabulates sample and other conditions regarding the deodorization test of the PU films containing powdered coffee carbons.

The powdered coffee carbons similar to nanoscale components can be used as adhesion and added to PU films in a manufacturing process. The sample and other conditions regarding the deodorization test of the PU films containing powdered coffee carbons are tabulated in FIG. 5E.

Figure 5F:
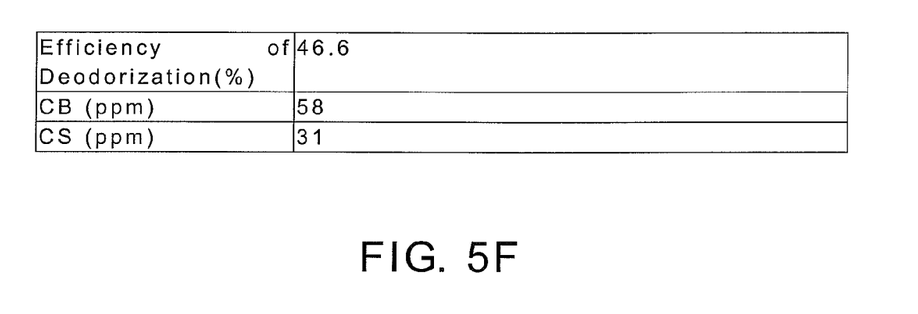
FIG. 5F tabulates test results regarding comparing a gas bag formed of PU film containing powdered coffee carbons of the invention and a gas bag formed of PU film without the powdered coffee carbons when subjecting to the deodorization test.

Further, a gas bag formed of PU film containing powdered coffee carbons of the invention and a gas bag formed of PU film without the powdered coffee carbons are subjected to the deodorization test, and test results are tabulated in FIG. 5F. It is shown that the invention has improved deodorization performance.

Figure 5G:
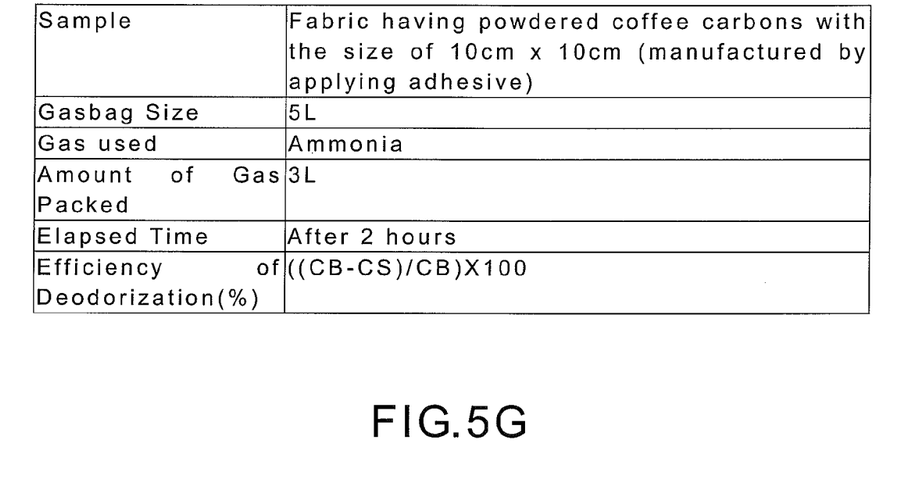
FIG. 5G tabulates sample and other conditions regarding the deodorization test of the fabric containing powdered coffee carbons.

Furthermore, powdered coffee carbons similar to nanoscale components can be used as adhesion and be applied onto fabric with micro-porous coating to form fabric containing powdered coffee carbons similar to nanoscale components and which is in turn subjected to the deodorization test. The sample and other conditions regarding the deodorization test are shown in FIG. 5G.

Figure 5H:
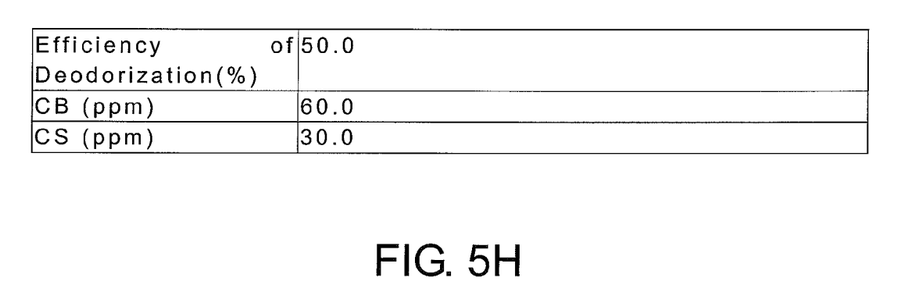
FIG. 5H tabulates test results regarding comparing the fabric containing powdered coffee carbons of the invention and the fabric without the powdered coffee carbons when subjecting to the deodorization test.

A gas bag formed of fabric containing powdered coffee carbons of the invention and a gas bag formed of fabric without the powdered coffee carbons are subjected to the deodorization test, and the test results are tabulated in FIG. 5H. It is shown that the invention has improved deodorization performance.

(III) Test of Keeping Temperature at a Constant Level

Figure 2:
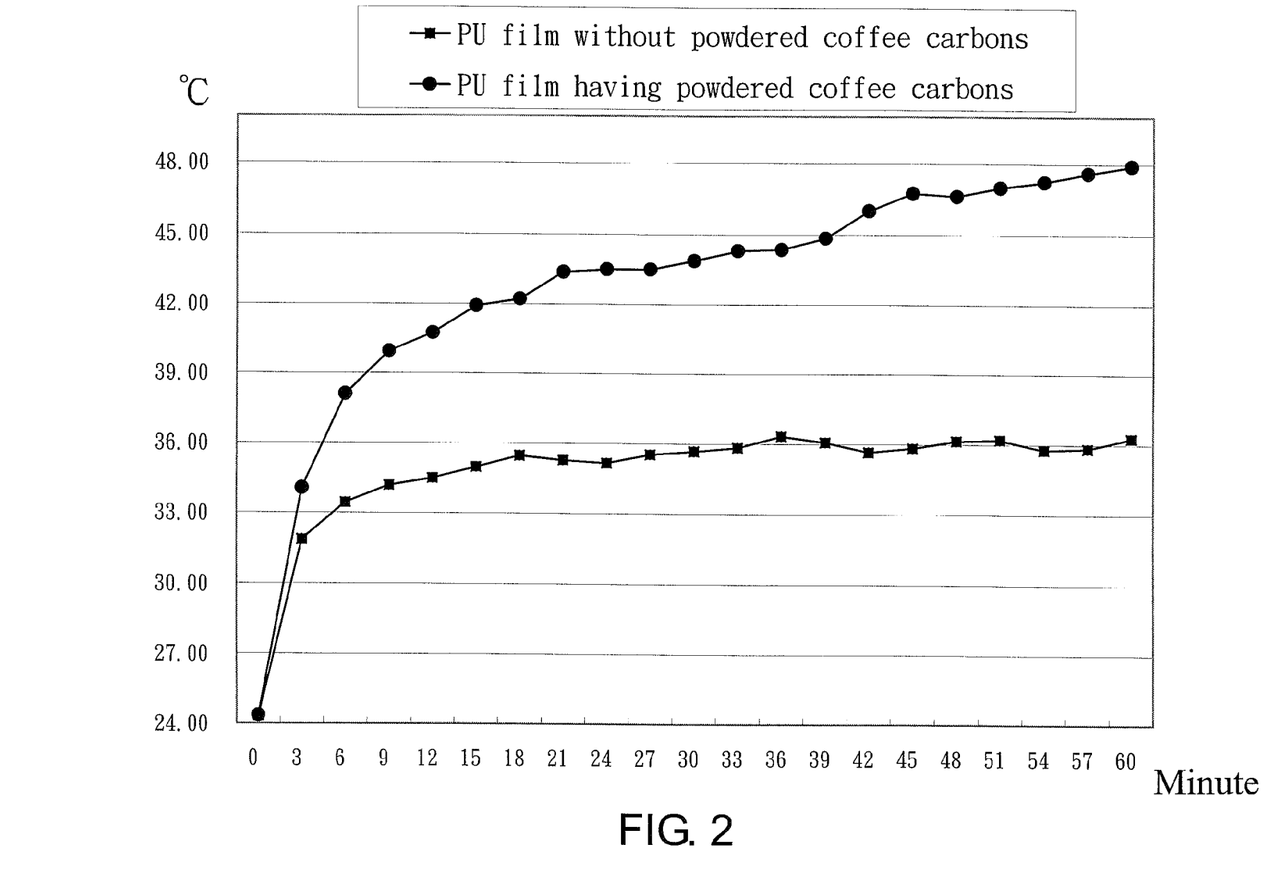
FIG. 2 plots temperature versus time for a PU film having powdered coffee carbons of the invention and a PU film without powdered coffee carbons of the prior art as a comparison.

Referring to FIG. 2, a PU film containing powdered coffee carbons is illuminated by a halogen lamp of 500 W for about 60 minutes. It is found that the PU film containing powdered coffee carbons has a temperature of about 48° C. As a comparison, the typical PU film without the addition of powdered coffee carbons only has a temperature of about 36° C. when subjected to the same illumination conditions. In brief, the PU film containing powdered coffee carbons of the invention has an improved temperature keeping performance.

Powdered coffee carbons of the invention have a wide range of applications. For example, it can be employed as filters as a replacement of typical activated carbon filters. Further, the powdered coffee carbons do not contain any toxic materials such as fertilizer, toxic chemicals, etc. The powdered coffee carbons can be employed as material in manufacturing masks for medical purposes. Further, the powdered coffee carbons can be used in the textile industry. For example, a predetermined amount of powdered coffee carbons can be added to a polymer for thread making. The manufactured yarns have the features of micro-organism inhabitation, deodorization, temperature keeping, UV (ultraviolet) protection, sweat absorption, etc. Most importantly, the manufacturing processes of the invention involve no chemical reactions. This is a green technology.

While the invention herein disclosed has been described by means of specific embodiments, numerous modifications and variations could be made thereto by those skilled in the art without departing from the scope and spirit of the invention set forth in the claims.

What is claimed is:

1. A process of manufacturing powdered coffee carbons from spent coffee grounds comprising:
   (A) washing spent coffee grounds with fresh water, dehydrating same, and conveying same to a pre-carbonation oven for drying and pre-carbonization;
   (B) removing the pre-carbonized spent coffee grounds from the pre-carbonization oven, soaking same in a solution mixed with a predetermined quantity of sodium carbonate ($Na_2CO_3$) for a predetermined period of time for grease removal, and washing the grease-free spent coffee grounds with fresh water;
   (C) pouring the pre-carbonized spent coffee grounds into a post-carbonization oven and heating the pre-carbonized spent coffee grounds to a range of 600 to 650° C. to carbonize the pre-carbonized spent coffee grounds, wherein carbonized spent coffee grounds have a porous structure;
   (D) activating the carbonized spent coffee grounds by supplying saturated steam of 850 to 950° C. to the carbonized spent coffee carbons; and
   (E) wet grinding the activated spent coffee carbons until powdered coffee carbons having a size between 0.1 and 20 μm are obtained.

2. The process of claim 1, wherein a temperature of the pre-carbonization oven is set at between 170 and 185° C. for 85 to 120 minutes with a steam pressure of 3 to 6 Kg/cm.

3. The process of claim 1, wherein the predetermined quantity of sodium carbonate ($Na_2CO_3$) is about 0.5 g/l, and wherein the predetermined period of time for grease removal is about 120 minutes.

4. The process of claim 1, wherein wet grinding comprises:
   (E-1) pouring the activated coffee carbons into a first grinder including grinding balls having a diameter between 1.75 and 2.5 mm, mixing a predetermined liquid with the activated coffee carbons until the activated coffee carbons have a viscosity of about 100,000 centipoises (cps) and a solid percentage of 80 to 85 wt %, operating the first grinder for a first predetermined period of time, and drying the activated coffee carbons to form first micrometer sized powered coffee carbons having a size of about 20 μm;
   (E-2) pouring the first micrometer sized powdered coffee carbons into a second grinder including grinding balls having a diameter between 0.7 and 0.9 mm, mixing the predetermined liquid with the first micrometer sized powdered coffee carbons until the first micrometer sized powdered coffee carbons have a viscosity of less than 2,000 cps and a solid percentage of 70 to 75 wt %, operating the second grinder for a second predetermined period of time, and drying the first micrometer sized powdered coffee carbons to form second micrometer sized powdered coffee carbons having a size of about 2 μm; and
   (E-3) pouring the second micrometer sized powdered coffee carbons into a third grinder including grinding balls having a diameter between 0.7 and 0.9 mm, mixing the predetermined liquid with the second micrometer sized powdered coffee carbons until the second micrometer sized powdered coffee carbons have a viscosity of less than 100 cps and a solid percentage of 30 to 35 wt %, operating the third grinder for a third predetermined period of time, and drying the second micrometer sized powdered coffee carbons to form powdered coffee carbons having a size of about 0.1 μm similar to nanoscale components.

5. The process of claim 4, wherein the predetermined liquid is pure water or isopropyl alcohol.

\* \* \* \* \*